United States Patent
Zia

(10) Patent No.: US 9,813,409 B2
(45) Date of Patent: Nov. 7, 2017

(54) METHOD OF DYNAMICALLY ADAPTING A GRAPHICAL PASSWORD SEQUENCE BY EXECUTING COMPUTER-EXECUTABLE INSTRUCTIONS STORED ON A NON-TRANSITORY COMPUTER-READABLE MEDIUM

(71) Applicant: Yahya Zia, Severn, MD (US)

(72) Inventor: Yahya Zia, Severn, MD (US)

(*) Notice: Subject to any disclaimer, the term of this patent is extended or adjusted under 35 U.S.C. 154(b) by 62 days.

(21) Appl. No.: 14/672,076

(22) Filed: Mar. 27, 2015

(65) Prior Publication Data

US 2015/0281215 A1 Oct. 1, 2015

Related U.S. Application Data

(60) Provisional application No. 61/971,330, filed on Mar. 27, 2014.

(51) Int. Cl.
*G06F 21/46* (2013.01)
*H04L 29/06* (2006.01)
*G06F 21/36* (2013.01)

(52) U.S. Cl.
CPC ............ *H04L 63/083* (2013.01); *G06F 21/36* (2013.01)

(58) Field of Classification Search
CPC .................................. G06F 21/36; G06F 21/45
See application file for complete search history.

(56) References Cited

U.S. PATENT DOCUMENTS

| | | | | |
|---|---|---|---|---|
| 8,756,672 B1* | 6/2014 | Allen | ...................... | G06F 21/36 345/173 |
| 8,881,251 B1* | 11/2014 | Hilger | .................. | H04L 63/083 713/183 |
| 2007/0061864 A1* | 3/2007 | Bali | ........................ | G06F 21/55 726/2 |
| 2007/0277224 A1* | 11/2007 | Osborn | ................... | G06F 21/36 726/2 |
| 2008/0077978 A1* | 3/2008 | Repasi | .................... | G06F 21/36 726/5 |
| 2008/0244700 A1* | 10/2008 | Osborn | ................... | G06F 21/36 726/2 |

(Continued)

OTHER PUBLICATIONS

Thorpe, Julie, and Paul C. van Oorschot. "Towards secure design choices for implementing graphical passwords." Computer Security Applications Conference, 2004. 20th Annual. IEEE, 2004.*

(Continued)

*Primary Examiner* — Yin-Chen Shaw
*Assistant Examiner* — Michael Guirguis

(57) ABSTRACT

A method of dynamically adapting a graphical password sequence provides a secure means to access a restricted account through a dynamic password defined by element selection requirements. A selection grid is dynamically generated with graphical elements, and a password sequence is inputted by selecting certain grid cells containing graphical elements. Various preferences provide full customizability for the dynamic password, and security measures increase the difficulty of an undesirable user ascertaining the element selection requirements. The dynamic password can adapt over time through user input by designating one of the sequential locations of the password sequence as a sequence updating parameter.

14 Claims, 13 Drawing Sheets

Selection Grid

(56) References Cited

U.S. PATENT DOCUMENTS

| | | | | |
|---|---|---|---|---|
| 2011/0016520 A1* | 1/2011 | Cohen | ............. | G06F 21/36 726/19 |
| 2012/0011575 A1* | 1/2012 | Cheswick | ............. | G01S 19/14 726/5 |
| 2012/0066744 A1* | 3/2012 | Knox | ............. | G06F 21/36 726/4 |
| 2013/0298223 A1* | 11/2013 | Li | ............. | G06F 21/46 726/18 |
| 2015/0074800 A1* | 3/2015 | Farraro | ............. | G06F 21/35 726/20 |

OTHER PUBLICATIONS

Chalkias, Konstantinos, Anastasios Alexiadis, and George Stephanides. "A multi-grid graphical password scheme." Proceedings of the 6th International Conference on Artificial Intelligence and Digital Communications, Thessaloniki, Greece. 2006.*

* cited by examiner

METHOD OF DYNAMICALLY ADAPTING A GRAPHICAL PASSWORD SEQUENCE BY EXECUTING COMPUTER-EXECUTABLE INSTRUCTIONS STORED ON A NON-TRANSITORY COMPUTER-READABLE MEDIUM

The current application claims a priority to the U.S. Provisional Patent application Ser. No. 61/971,330 filed on Mar. 27, 2014.

FIELD OF THE INVENTION

The present invention relates generally to password authentication. More particularly, the present invention relates to adapting a password sequence over time based on user preferences.

BACKGROUND OF THE INVENTION

As the internet has been adopted for use by a number of businesses, potential consumers have found themselves being required to remember multiple account names and passwords. The resulting negative effects have become known as password fatigue, with users often attempting to ease their burden by writing down passwords, reusing passwords, or selecting weak passwords. Alternatively, those who use complex passwords in order to be more secure are also more likely to forget their passwords. Thus users are often their own greatest threat in terms of password-based authentication. Though some solutions have been developed that manage all of a user's passwords, they are not without their own shortcomings. The security requirements to periodically change passwords create additional issues related to authentication, as users have to remember new passwords. If passwords are not required to be updated then the system becomes less secure due to password stagnation. Many security systems require passwords to be changed multiple times per a year and include a number of restrictions that increase password security but hamper password retention by the user. There exists a need for a user-friendly password authentication system which adapts the password over time based on changes in user patterns.

It is therefore an objective of the present invention to provide a personalized password function that is used to create and output an interface for user authentication. It is a further objective of the present invention to use the personalized password function to update the password based on changing user patterns. It is an overall objective of the present invention to provide a system for a user-friendly and security-enhancing password that adapts over time.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a method provided for user authentication in order to grant the user access to restricted information on an electronic system. The present invention utilizes an adaptive password model to allow for a graphical (inclusive of alphanumeric characters) password to adapt over time. The adaptive nature of the graphical password results in an authentication system which is friendlier towards users as well as more secure due to its fluid nature. The present invention is suitable for use with any system in which a user account, information, or other valuable resource (e.g. digital password for using a credit card) is protected by password authentication. While an obvious application of the present invention is with online accounts, it can be utilized in other scenarios to protect valuable resources with an adaptable password. For example, the present invention could be used in place of debit card PINs and credit card signatures, with the adaptable password effectively substituting for entering a PIN or writing a signature. The present invention can also be utilized to substitute the need for swiping a credit or debit card altogether, and instead allow the user to authenticate via the personalized password and sign or enter a pin to complete the transaction.

The present invention may be executed on any relevant and useful computing device which can be utilized for user authentication such as, but not limited to, a personal computer, a laptop computer, a mobile phone, a tablet or other mobile device, or another type of device with a user interface, which a user utilizes to interact with the present invention. The present invention may require the use of well known algorithms or processes not herein described. The present invention is preferably embodied as a software application, package or system, and should not be limited to any specific operating system, device, or programming language.

Figure 1:
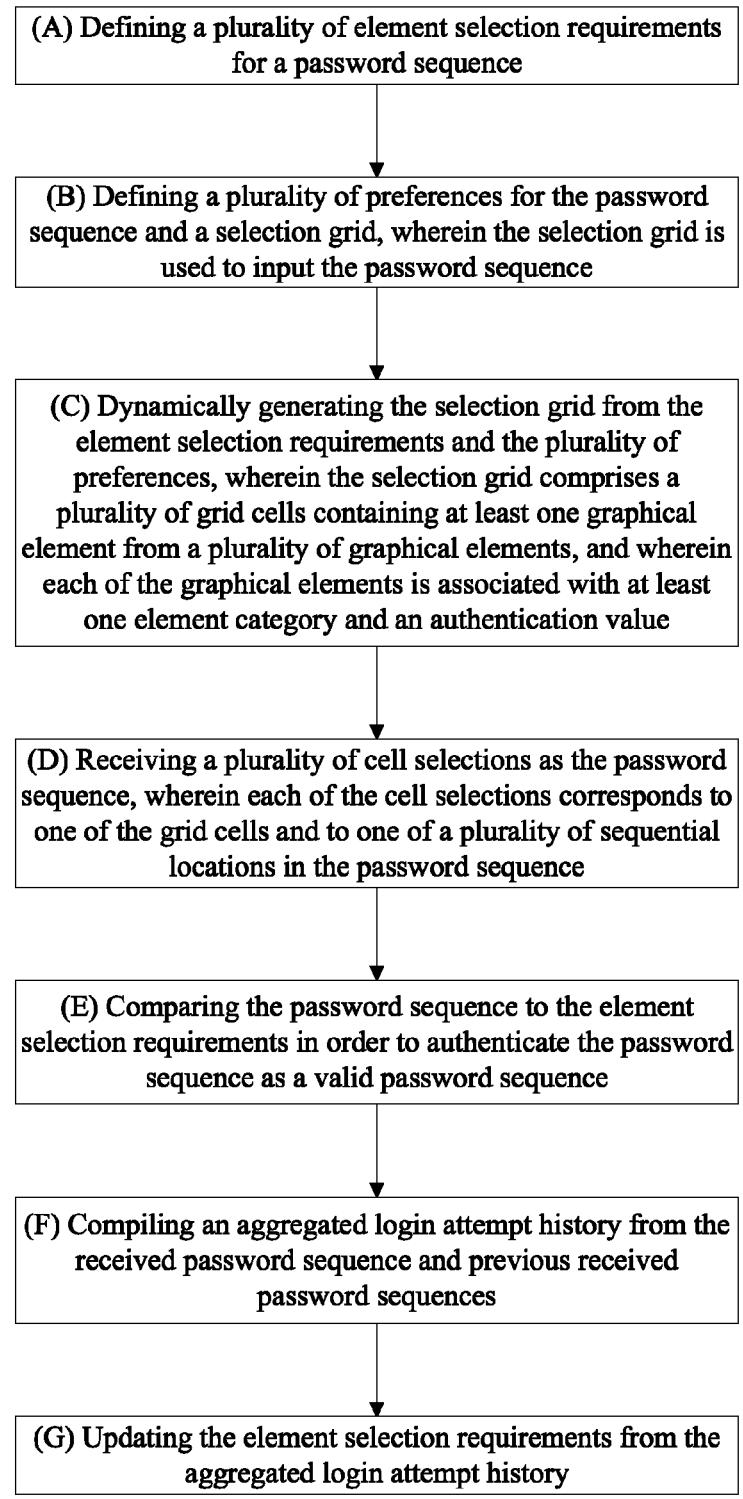
FIG. 1 is a stepwise flow diagram describing the general process of the present invention.
Figure 10:
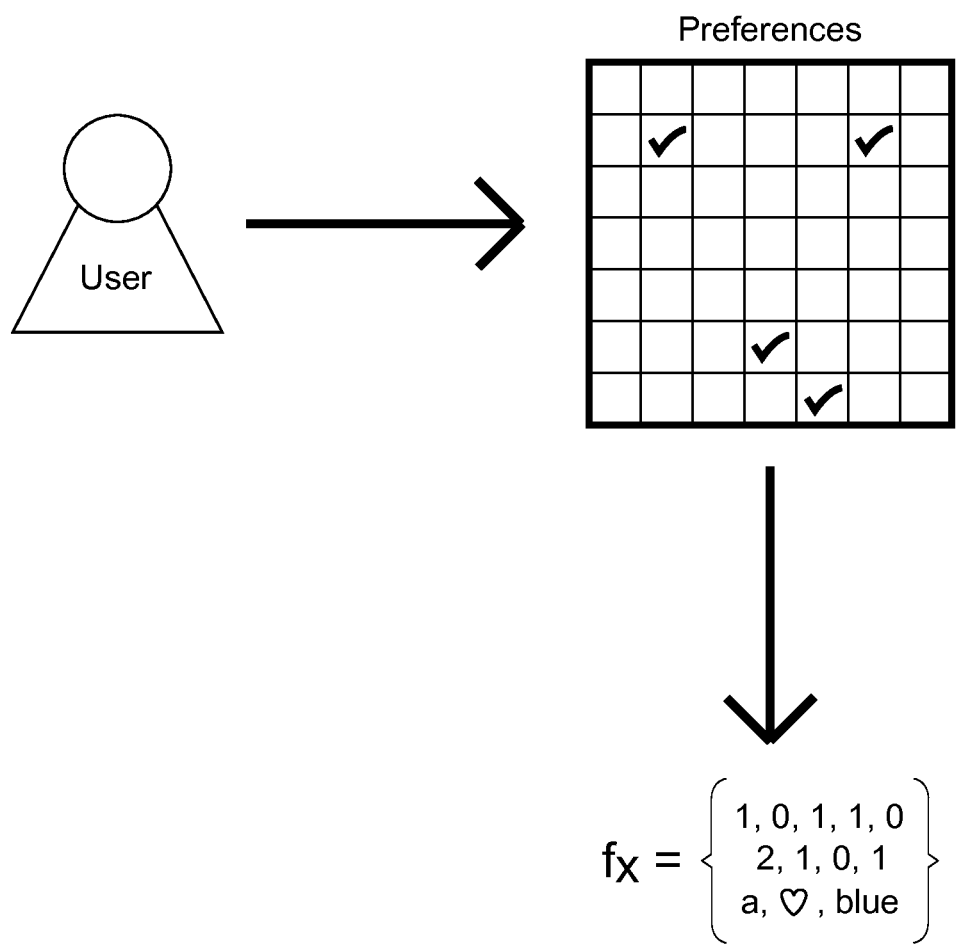
FIG. 10 is an illustration depicting the selection grid setup.

Referring to FIGS. 1 and 10, in the general process of the present invention, a plurality of element selection requirements for a password sequence are defined. The user may be prompted to manually configure the element selection requirements, or a plurality of predefined parameters for elements selection requirements may be provided, from which the user chooses. The element selection requirements act similarly to defining a static password by providing stipulations for entering a valid password. In this case however, since the password is not necessarily defined by static elements, a dynamic password is defined by the element selection requirements, which may delineate static or dynamic requirements. The element selection requirements may be alternatively referred to hereinafter as the password or the dynamic password. A plurality of preferences for the password sequence and for a selection grid are also defined, wherein the selection grid is used to input the password sequence. In the preferred embodiment of the present invention, a minimum authentication score is designated for the password sequence as one of the element selection requirements.

Figure 2:
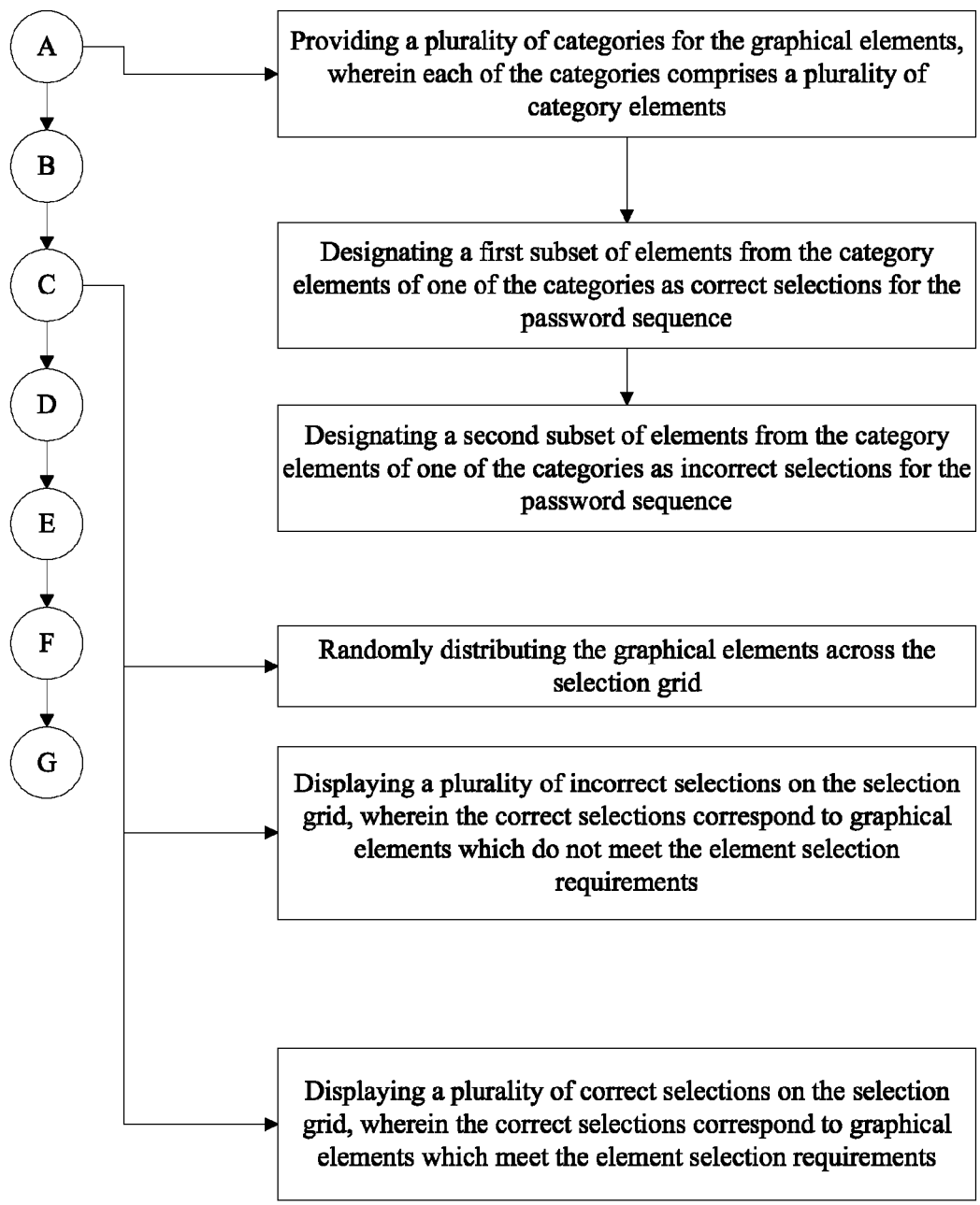
FIG. 2 is a stepwise flow diagram describing steps for displaying the graphical elements on the selection grid.

The element selection requirements define parameters for inputting a valid password sequence. In the preferred embodiment of the present invention, instead of or in addition to defining static elements, categories may be defined for the requirements as shown in FIG. 2. This adds an extra layer of complexity for anyone trying to ascertain the user's password, since a single graphical element may belong to more than one category. For example, a graphical element may be a blue square with an outline. This example graphical element may satisfy the requirement of color, blue, shape, square, or outline. When the user selects this graphical element, an observer cannot discern to which category the element belongs, making it very difficult to ascertain how to enter a valid password sequence.

The selection grid comprises a plurality of grid cells containing at least one graphical element from a plurality of graphical elements, with each of the graphical elements being associated with at least one element category and an authentication value. The selection grid is dynamically generated from the element selection requirements and the plurality of preferences. In the preferred embodiment, more than one graphical element may be displayed within the same grid cell. This adds further complexity to the requirements for entering a valid password sequence by raising the total number of possible combinations in any given grid cell.

Figure 12:
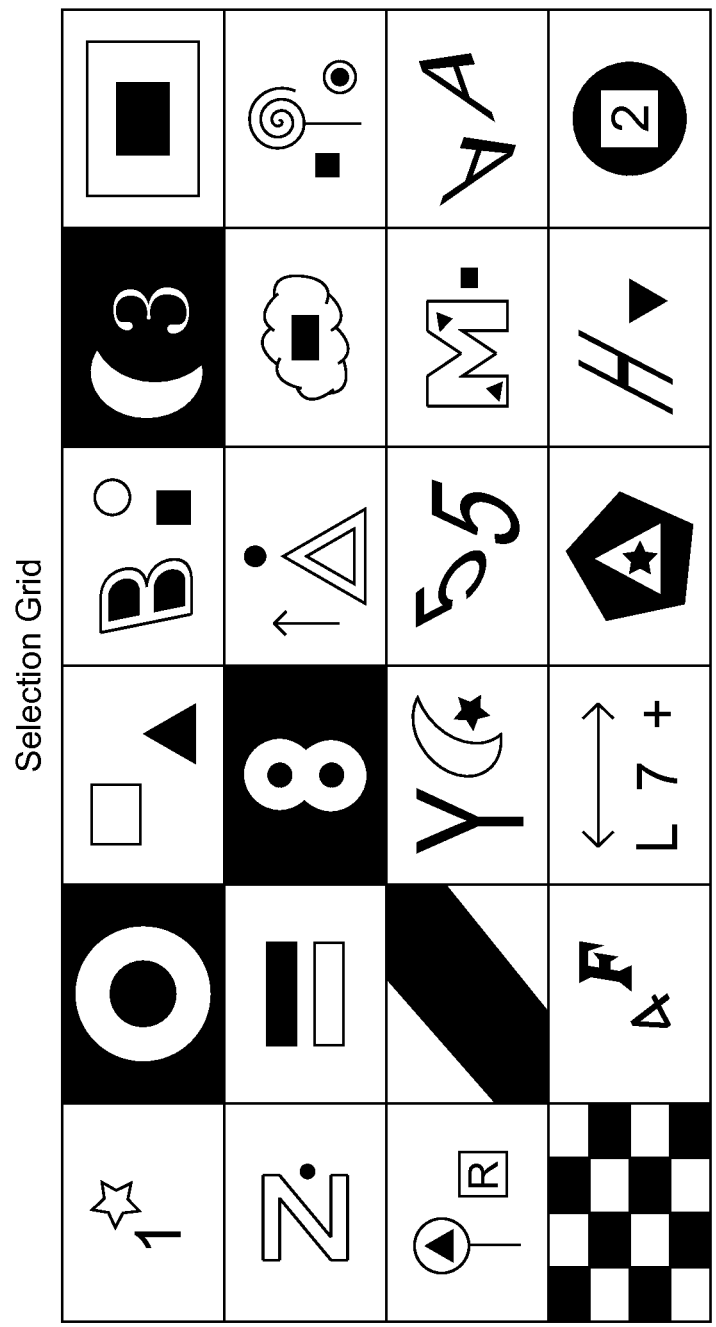
FIG. 12 is an illustration of an example selection grid.

As an example, a user provides the number five, a star, and the color green as the element selection requirements. When proceeding through the authentication process, the user must then correctly select these same graphical elements (i.e. one displaying a "five", one colored green, and one displaying a star), which are randomly assigned to grid cells. If each grid cell only contains a single graphical element, then the user must simply select grid spots with the corresponding preference from the dynamic password. If a more complex selection grid (using multiple graphical elements in each grid cell) is generated, then the user must select grid cells in which one of the displayed elements matches part of the password. Continuing with the previous example, certain grid cells may contain a blue number five, a number three centered in a star, and a green sphere. The user knows to select these grid cells as they have the "five", "green" color, and "star" that are part of the original element selection requirements. However, another person will not be able to tell that those are part of the password, as the color blue, number three, and the sphere were also in the grid spots. Additional preferences can be added to each grid cell to further increase the complexity (and ultimately security) as earlier mentioned. An example selection grid is shown in FIG. 12.

Figure 5:
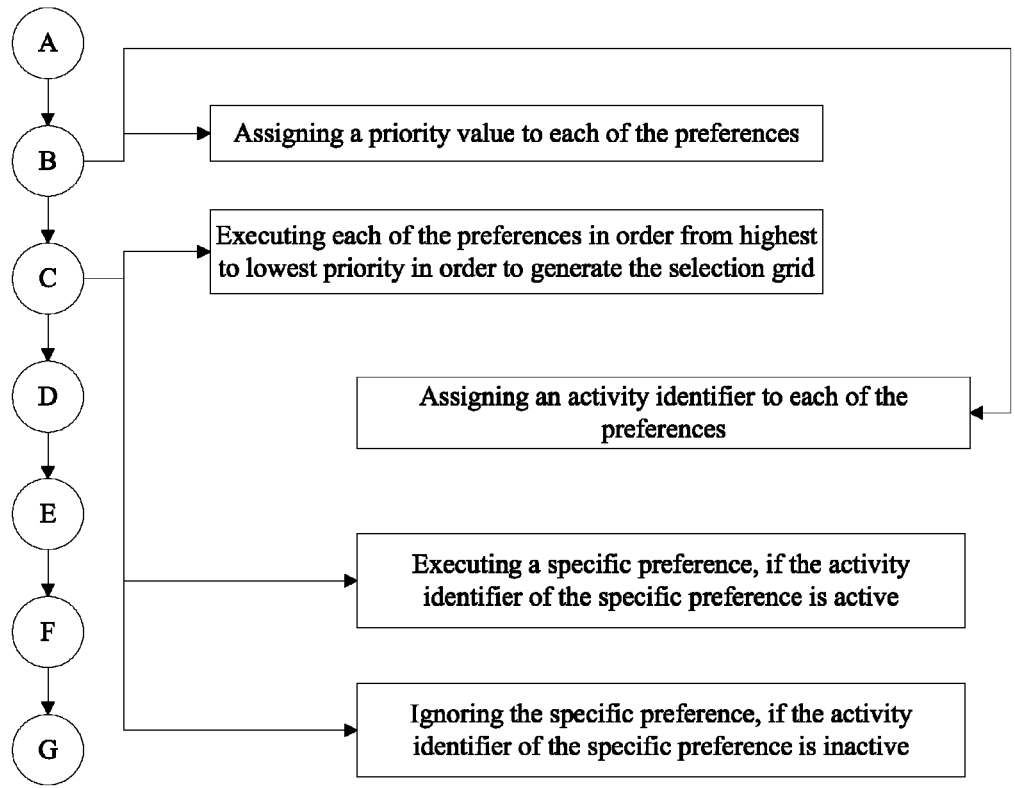
FIG. 5 is a stepwise flow diagram describing steps for initializing and using the preferences.

Referring to FIG. 5, in the preferred embodiment, each of the preferences is assigned a priority value. The priority value for each of the preferences may be customizably designated by the user. Each of the preferences is executed in order from highest to lowest priority while generating the selection grid. Additionally, an activity identifier may be assigned to each of the preferences. A specific preference is executed if the activity identifier of the specific preference is active. Conversely, the specific preference is ignored if the activity identifier of the specific preference is inactive. The user is provided with the option to change the priority value or activity identifier for any of the preferences as desired.

A plurality of correct selections and a plurality of incorrect selections are displayed as graphical elements on the selection grid. In the preferred embodiment, the graphical elements are distributed randomly across the selection grid. This provides a layer of security where a nefarious party wishing to access the user's account cannot simply duplicate the grid locations of a previously entered password sequence. However, exceptions may be made according to one or more of the preferences. The correct selections correspond to graphical elements which meet the element selection requirements, and the incorrect selections correspond to graphical elements which do not meet the element selection requirements. Each of the graphical elements belongs to one of a plurality of categories, and each category comprises a plurality of category elements. Non limiting examples of categories may include, but are not limited to, numbers, shapes, colors, letters, and images.

Referring to FIG. 2, for a specific category from the plurality of categories, a first subset of elements from the category elements of the specific category may be designated as correct selections for the password sequence, and similarly a second subset of elements from the category elements of the specific category may be designated as incorrect selections for the password sequence. For example, if the specific category is alphabetical letters, the first subset of elements may be designated as containing the letters Y and Z, whereas the second subset of elements may be designated as containing J, U, N, R, and E.

Figure 11:
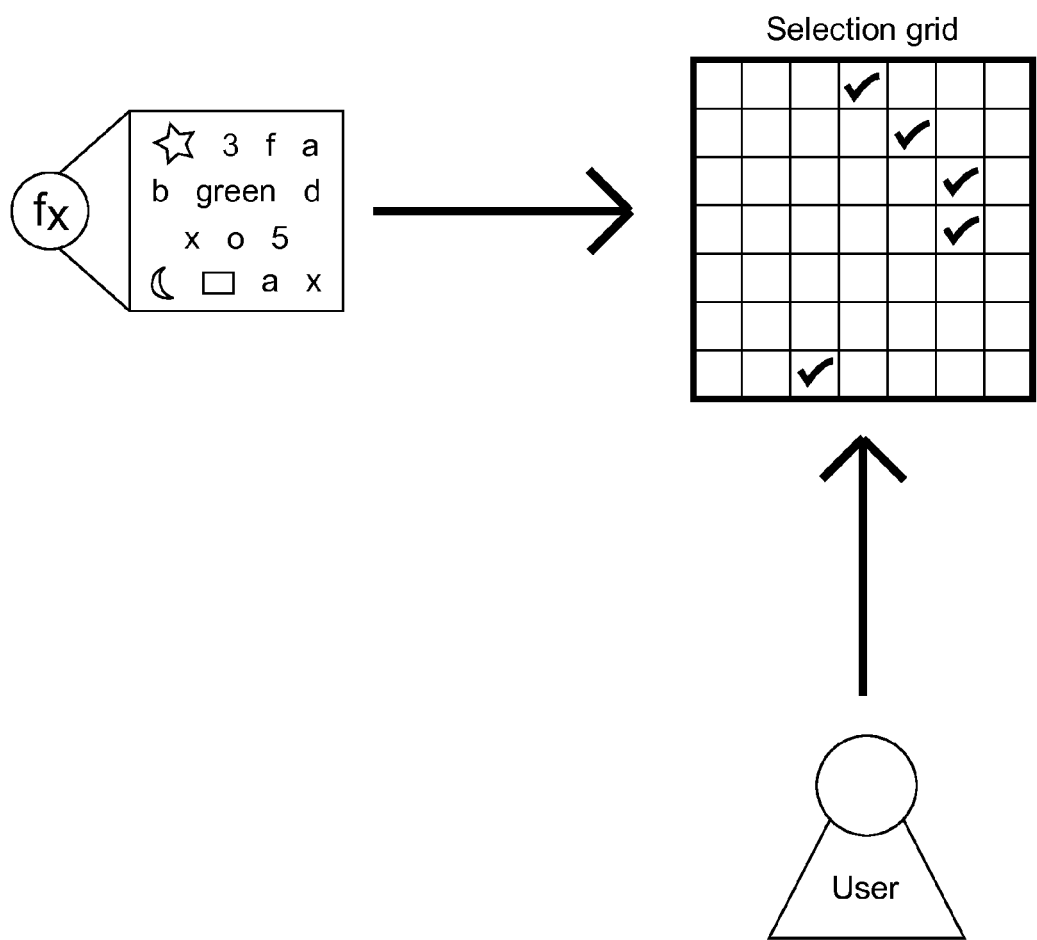
FIG. 11 is an illustration depicting entering a password sequence.

After the selection grid is generated, a plurality of cell selections are received as the password sequence as illustrated in FIG. 11. Each of the cell selections corresponds to one of the grid cells and to one of a plurality of sequential locations in the password sequence.

Subsequently, the password sequence is compared to the element selection requirements in order to authenticate the password sequence as a valid password sequence and grant access to the restricted account or information.

Figure 3:
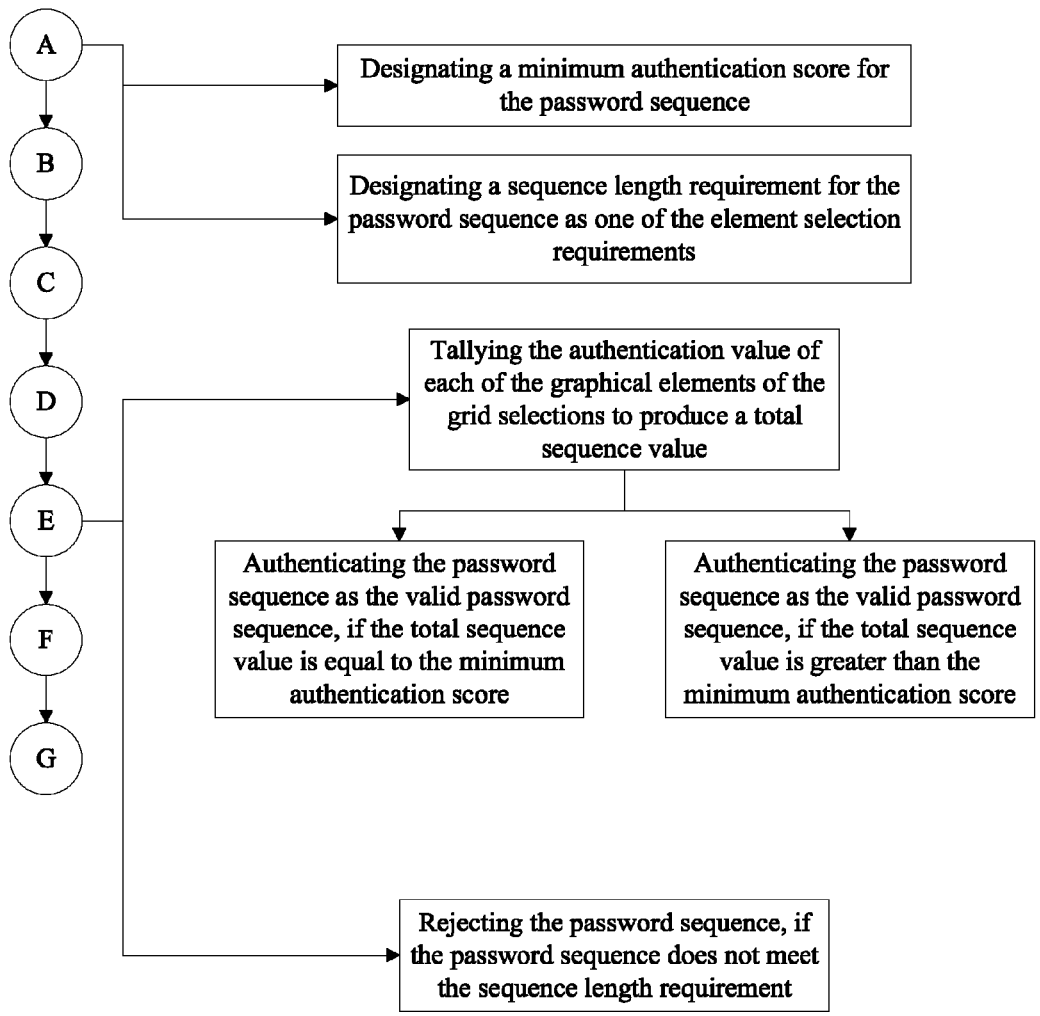
FIG. 3 is a stepwise flow diagram describing steps for authenticating the password sequence.
Figure 13:
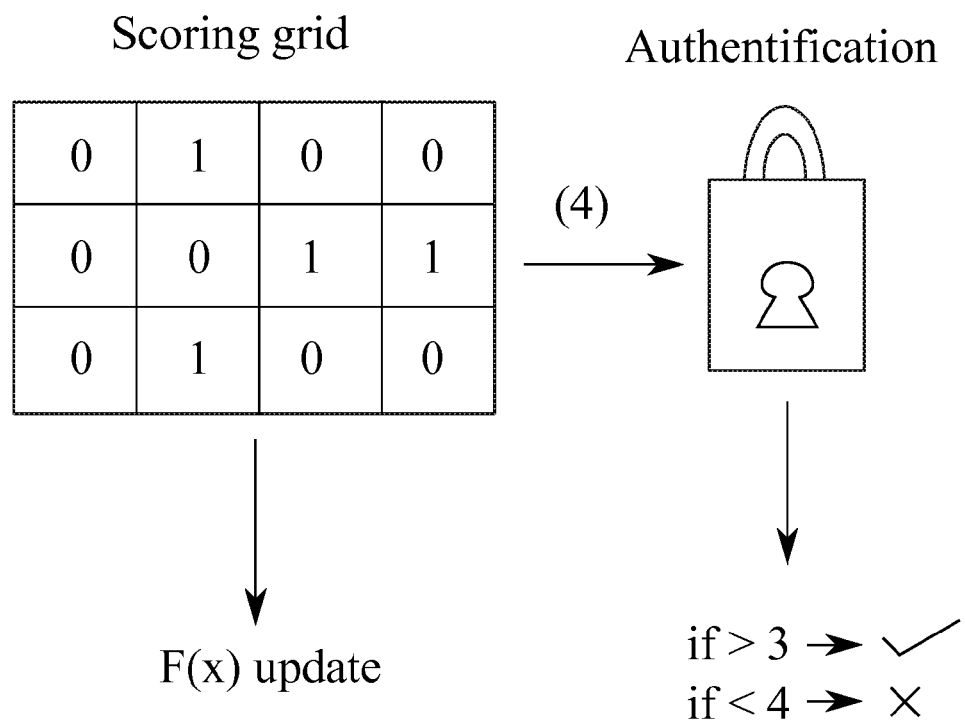
FIG. 13 is an illustration showing authentication and function updates based on results from a login attempt.

Referring to FIG. 3, one of the element selection requirements involves a minimum authentication score. In the preferred embodiment, each correct selection represents a positive value, and each incorrect selection represents a negative value. The authentication value of each of the graphical elements of the grid selections is tallied in order to produce a total sequence value. If all the other element selection requirements and preferences are satisfied, the password sequence is authenticated as the valid password sequence if the total sequence value is equal to the minimum authentication score. In another embodiment, the password sequence is authenticated as the valid password sequence, if the total sequence value is greater than the minimum authentication score. If the total sequence value is less than the minimum authentication score, the password sequence is rejected as invalid. One example of this process is illustrated in FIG. 13.

Another element selection requirement is a sequence length requirement. The sequence length requirement is designated by the user. The sequence length requirement designates a required number of cell selections for the password sequence. If the number of cell selections is less than the sequence length requirement, the password sequence does not meet the sequence length requirement and the password sequence is rejected.

Figure 4:
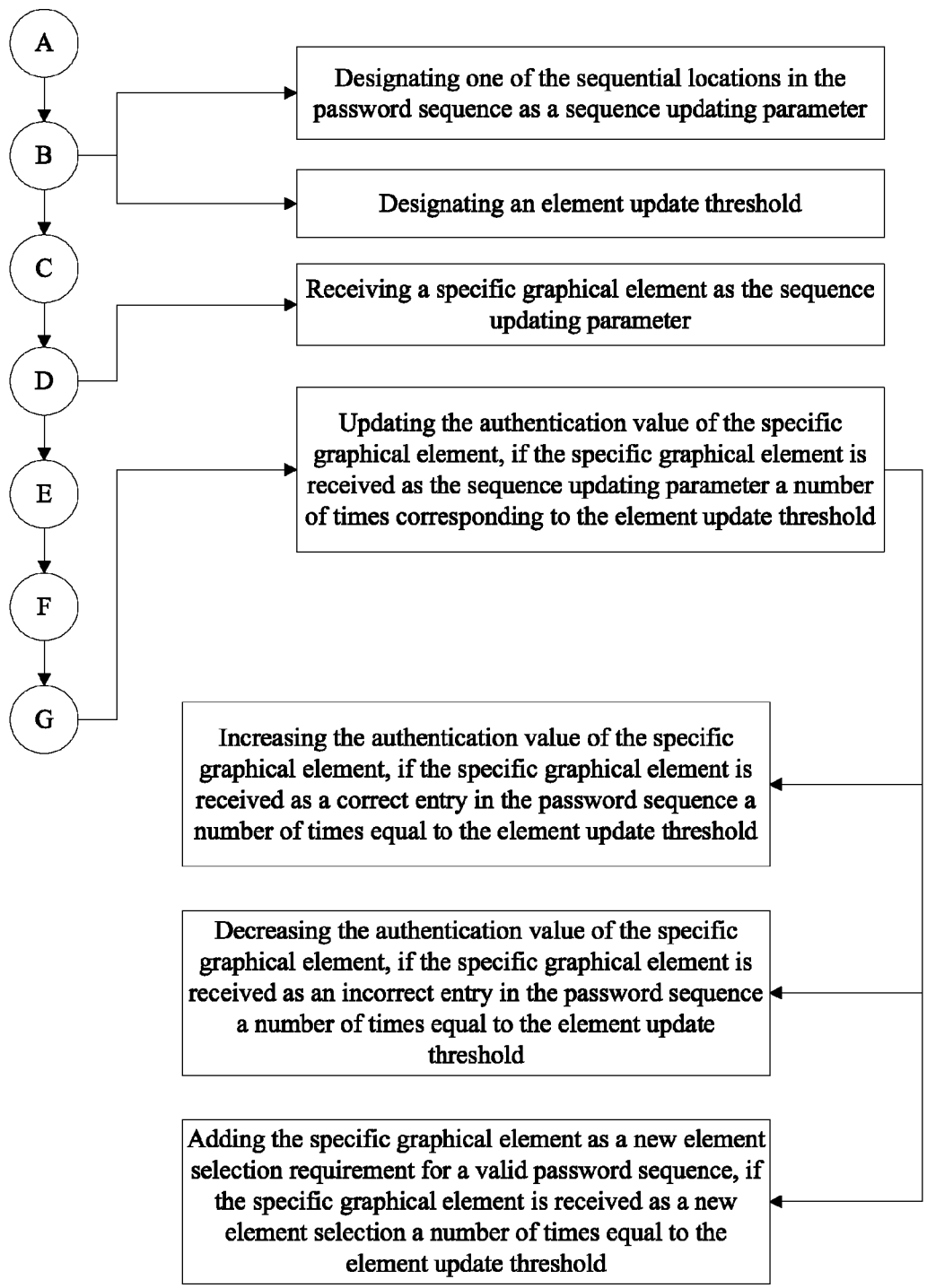
FIG. 4 is a stepwise flow diagram describing steps for updating the element selection requirements.
Figure 7:
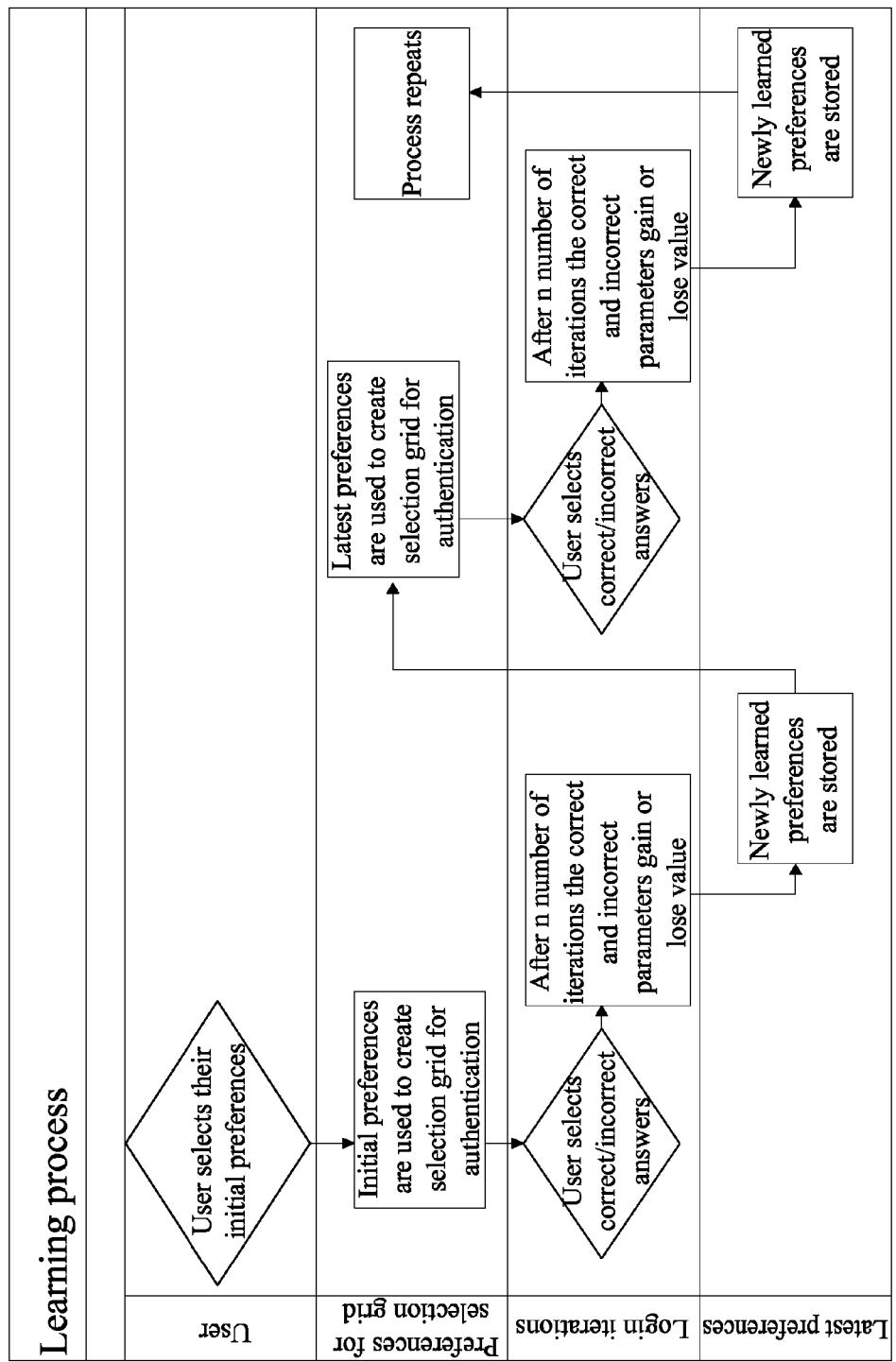
FIG. 7 is a flow diagram depicting the adaptive learning process of the dynamic password.

Referring to FIGS. 4 and 7, as one of the preferences, a user has the option to designate one of the sequential locations in the password sequence as a sequence updating parameter, which is utilized to update the element selection requirements. The user may also designate an update element threshold, which defines how many times a specific graphical element must be selected as the sequence updating parameter in order to update the element selection requirements. Over time, as the specific graphical element is received as the sequence updating parameter across multiple logins, the authentication value of the specific graphical element is updated. Specifically, the authentication value of the specific graphical element is updated if the specific graphical element is received as the sequence updating parameter a number of times corresponding to the element update threshold.

The sequence updating parameter can be configured to modify the requirements for a valid password sequence in multiple ways. The sequence updating parameter may be configured to increase the authentication value of a specific graphical element—if the specific graphical element is received as a correct entry in the password sequence a number of times equal to the element update threshold, the authentication value of the specific graphical element is increased.

Similarly, the sequence updating parameter may be configured to decrease the authentication value of a specific graphical element—if the specific graphical element is received as an incorrect entry in the password sequence a number of times equal to the element update threshold, the authentication value of the specific graphical element is decreased.

In one embodiment, the authentication value of the specific graphical element is modified by an integer value, and in another embodiment the authentication value of the specific graphical element is modified incrementally as a decimal. In other embodiments, the authentication value of the specific graphical element may be modified according to any alternate schemes.

Additionally, the sequence updating parameter may be configured to add a new graphical element to the element selection requirements. If the user wishes to add a graphical element representing a triangle shape, the user selects the same triangular graphical element as the sequence updating parameter a number of times equal to the update element threshold. The triangular graphical element may then be used to input a valid password sequence. Specifically, the specific graphical element is added as a new element selection requirement for a valid password sequence, if the specific graphical element is received as a new element selection a number of times equal to the element update threshold.

In the preferred embodiment, more than one sequence updating parameter may be utilized in a valid password sequence. For example, a first sequence updating parameter may be configured to increase the authentication value of a selected graphical element, a second sequence updating parameter may be configured to decrease the authentication value of a selected graphical element, and a third sequence updating parameter may be configured to add a new graphical element to the element selection requirements. Any sequence updating parameter may be designated at any sequential location in the password sequence as part of the preferences.

An aggregated login history is additionally compiled from the received password sequence and previous received password sequences. The first time a password sequence is received, the login history comprises only that singular password sequence. Over time, as the user repeatedly uses the present invention to log into their account, the login history becomes more robust, and the present invention can update the element selection requirements according to user input, either as preferences designated by the user, or as increased security measures due to incorrect login attempts. Therefore, the selection requirements may be updated from the aggregated login history with the authentication function.

Figure 6:
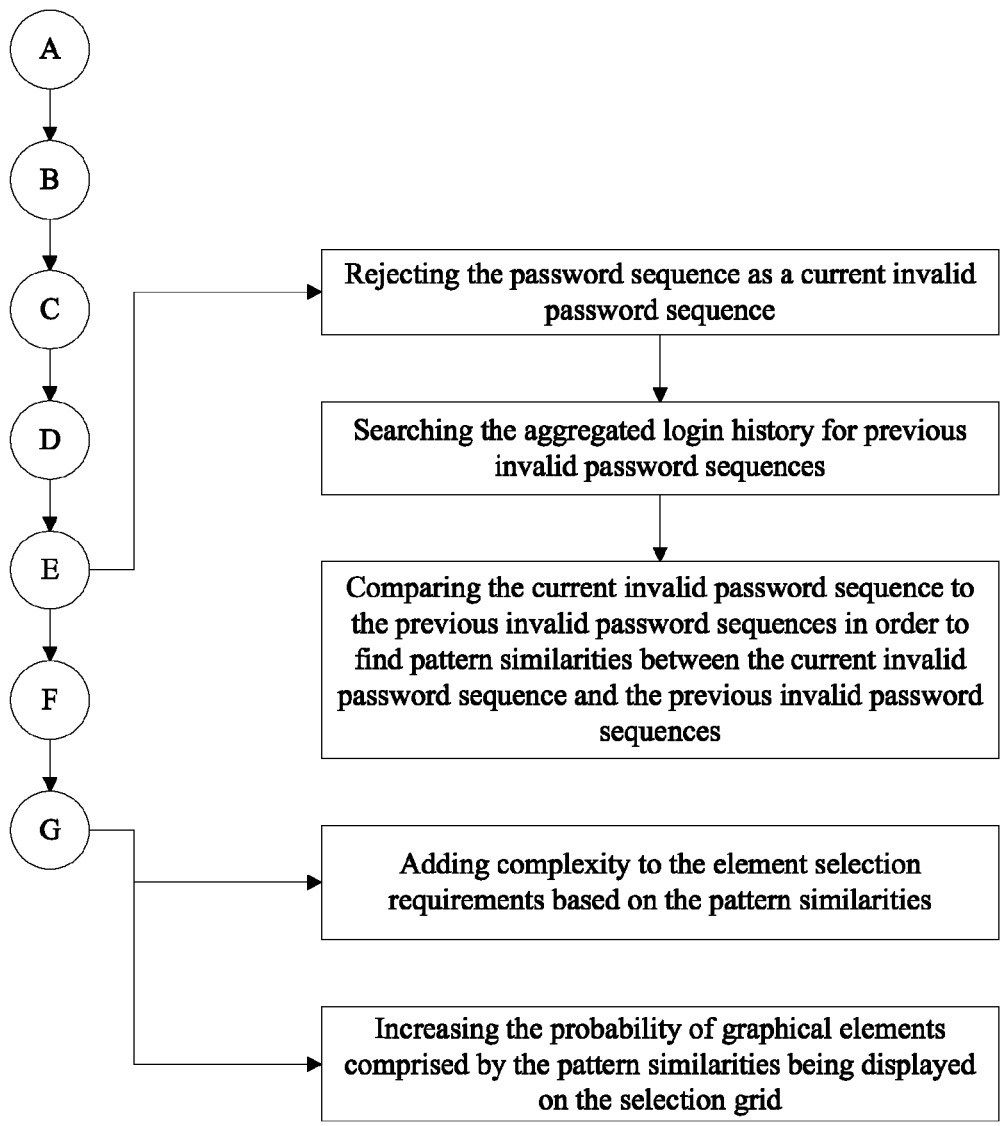
FIG. 6 is a stepwise flow diagram describing steps for invoking the security measures of the present invention.
Figure 8:
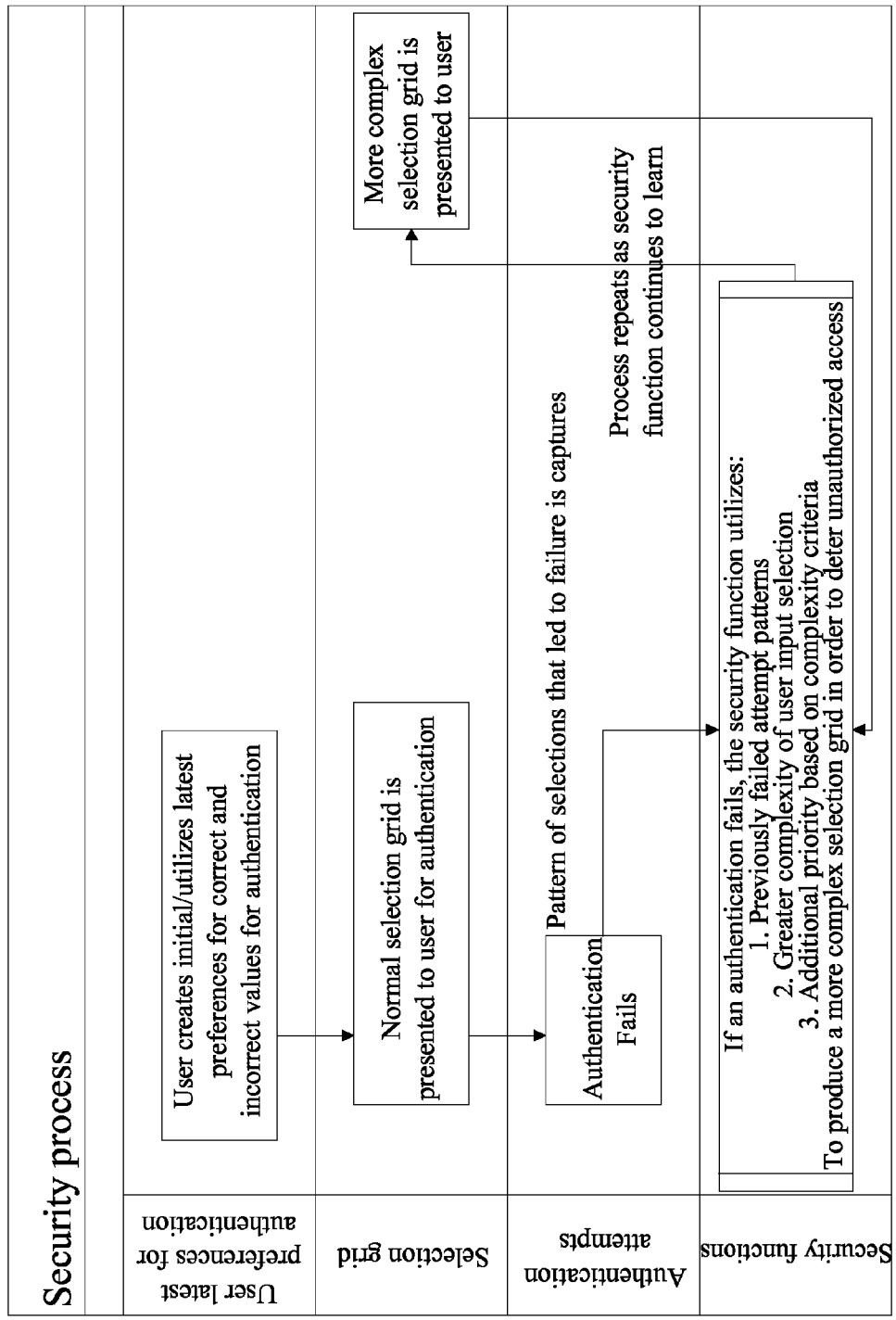
FIG. 8 is a flow diagram depicting the security process of the present invention.

Referring to FIGS. 6 and 8, as a security feature, the present invention seeks to hamper illicit user's attempts to access the user's profile. To this end, if the password sequence is rejected as a current invalid password sequence, the aggregated login history is searched for previous invalid password sentences. The current invalid password sequence is compared to the previous invalid password sequences in order to find pattern similarities between the current invalid password sequence and the previous invalid password sequences. If the pattern similarities are found, complexity is added to the element selection requirements based on the pattern similarities.

In one embodiment, the probability of graphical elements comprised by the pattern similarities are displayed on the selection grid in future login attempts. This means that if an illicit user attempts to login to an account that's not theirs, and the illicit user tends to make the same selections, the illicit user is recognized faster over time. For example, if the password sequence fails to be authenticated a certain number of times, the incorrect selections of the failed password sequences are displayed more often. In other words, if an illicit user is getting the password sequence wrong, the present invention learns the pattern that made the illicit user get the password sequence wrong, and increases the potential for the recognized wrong password sequence to be entered.

In another embodiment of a security feature of the present invention, any incorrect selections in the password sequence may increase in negative authentication value. Thus, similar to above, repeated incorrect selections lock out the illicit user faster as more attempts are made. Another option for a security feature of the present invention is to display incorrect selections more often. These security features aim to accomplish the same goal, which is to recognize a pattern of invalid password sequences and reject the invalid pattern faster over time.

The following is a non-limiting list of potential preferences that can be defined in the preferred embodiment of the present invention:

a. Location on Grid—this designates a specific cell of the selection grid that can be used as a sequence updating parameter or give a multiplicative effect to an authentication value. The user could suggest the specific cell on the grid (column x, and row y) to designate the position they want to update a graphical element as a correct or incorrect value. To give a multiplicative effect the user could suggest the specific cell on the grid to designate this the authentication value of a graphical element in the specific cell to be used as +2, +3 etc. or −2, −3, etc. when tallying the authentication values of the password sequence.

b. Numbers—this designates the numbers that can be selected as correct or incorrect values.
c. Alphabet—this designates the alphabet letters that can be selected as correct or incorrect values.
d. Symbol—this designates the symbols that can be selected as correct or incorrect values.
e. Color—this designates the colors that can be selected as correct or incorrect values.
f. Shape—this designates the shapes that can be used as correct or incorrect values.
g. Correct values selected—this designates the total number of correct values that must be selected from the grid.
h. Incorrect values selected—this designates the total number of incorrect values that must be selected from the grid.
i. Minimum authentication score—this designates the total final value needed for authentication. If a user selects an entry that has both a correct +1 and an incorrect −1 value in its composition then the total score for those selections will be 0.
j. New object training—this designates the sequential position in the password sequence used for modifying the element selection requirements by adding a new graphical element to the element selection criteria. If the user selects 4 here, then the 4th selection that the user makes will be learned by the system as incrementally moving towards a correct value if the graphical element of the selection was a zero or less value. The authentication value of the selection can additionally increase in the case that the authentication value of the selection is already a positive value which can lead to +2, +3, or greater values.
k. Known object removal—this designates the sequential position in the password sequence used for modifying the element selection requirements by removing a new graphical element from the element selection criteria. If the user selects 4 here, then the 4th selection that the user makes will be learned by the system as incrementally decreasing in authentication value if it greater than zero in value. It can also decrease its value in the event it was already a less than zero value which can lead to −2, −3, or lesser values.
l. Total values shown—this designates the size of the selection grid. In the preferred embodiment, the minimum of the grid size is 9, and the maximum of the grid size is 72, though other values can be designated for the minimum and maximum grid sizes.
m. Total values selected—this designates the total number of cell selections that must be selected in order for the authentication value of the password sequence to be calculated. If the minimum authentication value is met, but the total values needed for selection have not been met, the authentication will still fail.
n. Slide to select—this designates the ability to slide and select the values for touch enabled devices
o. Multiplier—this designates a multiplicative factor for a preference previously selected. This can be used to multiply the correct or incorrect effect for values such as location on grid, shape, color, numbers, or alphabets, for example.
p. Dimensions—this designates the multiple types of preferences that be utilized within each cell on the selection grid. A dimension of 3 can utilize color, shape, and number, while a dimension of 4 can utilize color, shape, number, and alphabet, for example.
q. Another example—this designates the ability for the user to add additional personalized preferences. Conceivably, any possible additional preference can be customizably defined.

Figure 9:
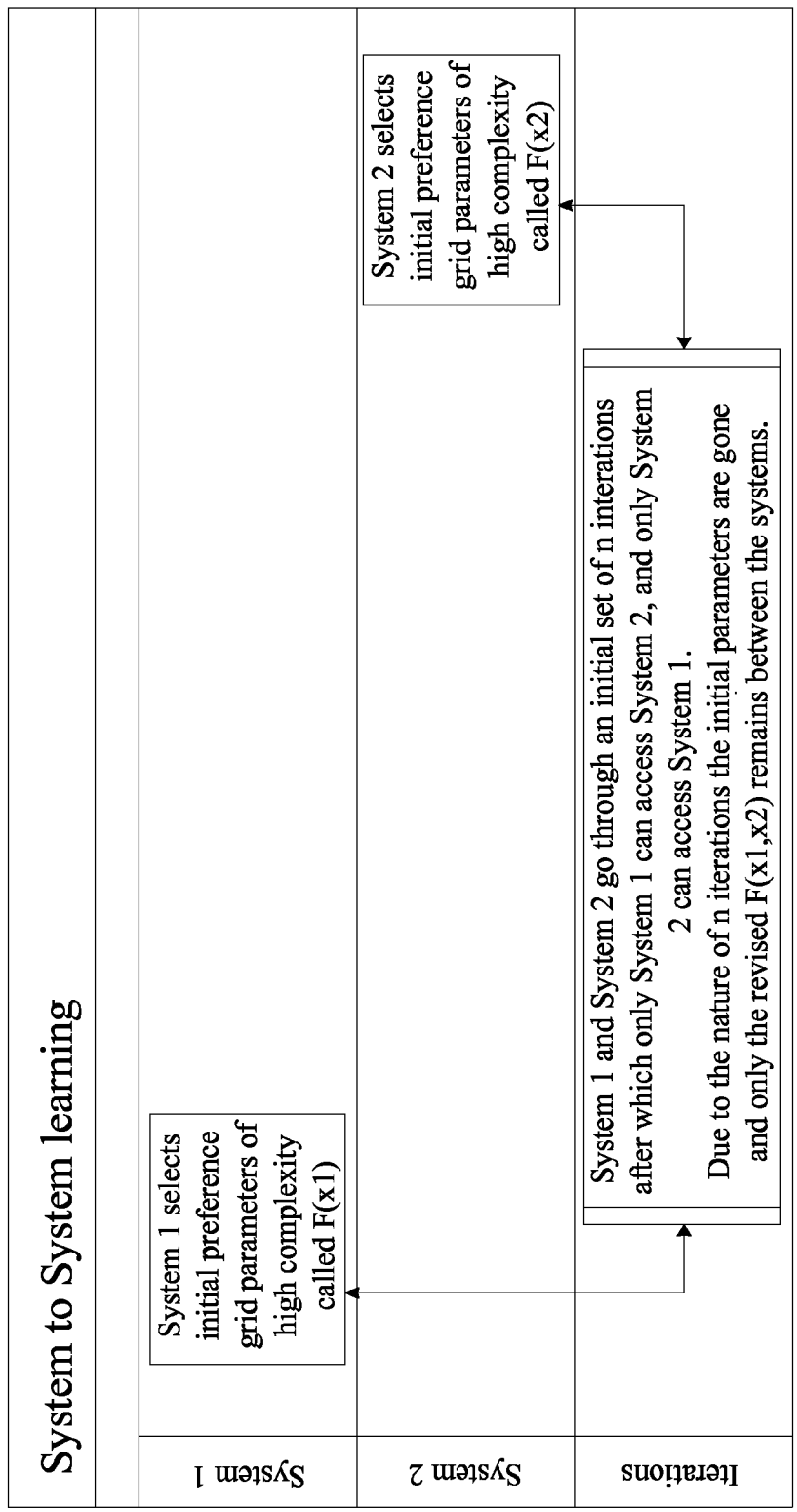
FIG. 9 is a flow diagram depicting system to system learning using the present invention.

Referring to FIG. 9, one application of the present invention involves system to system learning. In this case, the user is not a person, but a system—a computer or network of computers running software to operate the present invention. In this case, a first system and a second system act as two instances of the present invention, with the ability to access each other. The first system and the second system initialize respective element selection requirements, and proceed through many iterations of the aforementioned password updating process. The result is highly complex password sequence requirements which only the first system and the second system know as the original parameters are now lost.

Although the invention has been explained in relation to its preferred embodiment, it is to be understood that many other possible modifications and variations can be made without departing from the spirit and scope of the invention as hereinafter claimed.

What is claimed is:

1. A method of dynamically adapting a graphical password sequence by executing computer-executable instructions stored on a non-transitory computer-readable medium within a computing device, the method comprising:
   authenticating a user of the computing device to request access to a restricted user account on an electronic system;
   defining a plurality of element selection requirements for a password sequence;
   defining a plurality of preferences for the password sequence and a selection grid,
   wherein the selection grid is used to input the password sequence;
   dynamically generating the selection grid from the element selection requirements and the plurality of preferences,
   wherein the selection grid comprises a plurality of grid cells containing at least one graphical element from a plurality of graphical elements, and wherein each of the graphical elements is associated with at least one element category and an authentication value;
   displaying a user interface that that includes the selection grid;
   receiving a plurality of cell selections as the password sequence,
   wherein each of the cell selections corresponds to one of the grid cells and to one of a plurality of sequential locations in the password sequence;
   comparing the password sequence to the element selection requirements in order to authenticate the password sequence as a valid password sequence;
   compiling an aggregated login attempt history from the received password sequence and previous received password sequences;
   updating the element selection requirements from the aggregated login attempt history;
   rejecting the password sequence as a current invalid password sequence;
   searching the aggregated login attempt history for previous invalid password sequences;
   comparing the current invalid password sequence to the previous invalid password sequences in order to find pattern similarities between the current invalid password sequence and the previous invalid password sequences;

in response to finding the pattern similarities between the current and previous invalid password sequences, adding two layers of complexity to the element selection requirements by:
adding a first layer of complexity which comprises determining at least one or more incorrect graphical element selections from the pattern of similarities between the current and previous invalid password sequences, and increasing a probability of displaying the one or more incorrect graphical element selections in subsequent authentication attempts,
wherein said increasing renders the one or more incorrect graphical element selections displayed more often than other graphical elements; and
adding a second layer of complexity to the element selection requirements comprises increasing the number of the graphical elements displayed within each grid cell of the plurality of grid cells in the selection grid in the subsequent authentication attempts; and
in response to determining the password sequence as valid, accepting the password sequence as a current valid password sequence;
providing the access to the restricted user account in response to authenticating the user requesting the access with the current valid password sequence;
wherein the computing device and the user interface are used in an online financial transaction, with the restricted user account, where a user identification is entered into the user interface, the selection grid is retrieved, and the transaction is processed in response to the user being authenticated by providing the valid password sequence.

2. The method of claim 1, wherein the computing device further performs the step of:
displaying a plurality of correct selections on the selection grid,
wherein the correct selections correspond to graphical elements which meet the element selection requirements.

3. The method of claim 1, wherein the computing device further performs the step of:
displaying a plurality of incorrect selections on the selection grid,
wherein the correct selections correspond to graphical elements which do not meet the element selection requirements.

4. The method of claim 1, wherein the computing device further performs the steps of:
providing a plurality of categories for the graphical elements,
wherein each of the categories comprises a plurality of category elements;
designating a first subset of elements from the category elements of one of the categories as correct selections for the password sequence; and
designating a second subset of elements from the category elements of one of the categories as incorrect selections for the password sequence.

5. The method of claim 1, wherein the computing device further performs the steps of:
designating a minimum authentication score for the password sequence;
tallying the authentication value of each of the graphical elements of the grid selections to produce a total sequence value; and
authenticating the password sequence as the valid password sequence, if the total sequence value is equal to the minimum authentication score.

6. The method of claim 1, wherein the computing device further performs the steps of:
designating a minimum authentication score for the password sequence;
tallying the authentication value for each of the graphical elements of the grid selections to produce a total sequence value; and
authenticating the password sequence as the valid password sequence, if the total sequence value is greater than the minimum authentication score.

7. The method of claim 1, wherein the computing device further performs the steps of:
designating a sequence length requirement for the password sequence as one of the element selection requirements,
wherein the sequence length requirement designates a required number of cell selections; and
rejecting the password sequence, if the password sequence does not meet the sequence length requirement,
wherein the password sequence is rejected if the number of cell selections is less than the sequence length requirement.

8. The method of claim 1, wherein the computing device further performs the steps of:
designating one of the sequential locations in the password sequence as a sequence updating parameter;
designating an element update threshold;
receiving a specific graphical element as the sequence updating parameter; and
updating the authentication value of the specific graphical element, if the specific graphical element is received as the sequence updating parameter a number of times corresponding to the element update threshold.

9. The method of claim 8, wherein the computing device further performs the step of:
increasing the authentication value of the specific graphical element, if the specific graphical element is received as a correct entry in the password sequence a number of times equal to the element update threshold.

10. The method of claim 8, wherein the computing device further performs the step of:
decreasing the authentication value of the specific graphical element, if the specific graphical element is received as an incorrect entry in the password sequence a number of times equal to the element update threshold.

11. The method of claim 8, wherein the computing device further performs the step of:
adding the specific graphical element as a new element selection requirement for the valid password sequence, if the specific graphical element is received as a new element selection a number of times equal to the element update threshold.

12. The method of claim 1, wherein the computing device further performs the step of:
randomly distributing the graphical elements across the selection grid.

13. The method of claim 1, wherein the computing device further performs the steps of:
assigning a priority value to each of the preferences; and
executing each of the preferences in order from highest to lowest priority in order to generate the selection grid.

14. The method of claim 1, wherein the computing device further performs the steps of:

assigning an activity identifier to each of the preferences;
executing a specific preference, if the activity identifier of the specific preference is active; and
ignoring the specific preference, if the activity identifier of the specific preference is inactive.

* * * * *